United States Patent [19]
Naito et al.

[11] 4,201,776
[45] May 6, 1980

[54] FOOD ADDITIVE FOR REINFORCING FOODS DEFICIENT IN FIBER CONTENT

[75] Inventors: Ryoichi Naito, Ibaraki; Satoru Shiino, Uji; Hirohisa Inahara, Kyoto, all of Japan

[73] Assignee: The Green Cross Corporation, Osaka, Japan

[21] Appl. No.: 946,062

[22] Filed: Sep. 22, 1978

Related U.S. Application Data

[63] Continuation-in-part of Ser. No. 764,464, Jan. 31, 1977, abandoned.

[51] Int. Cl.$^2$ ............................................. A61K 35/78
[52] U.S. Cl. ................................................... 424/195
[58] Field of Search ........................................ 424/195

[56] References Cited

U.S. PATENT DOCUMENTS 3,787,591  1/1974  Hagewara ........................... 424/195

FOREIGN PATENT DOCUMENTS 51-42183  11/1976  Japan.

OTHER PUBLICATIONS

British Medical Journal, May 1971, pp. 450–454.

*Primary Examiner*—Donald B. Meyer
*Attorney, Agent, or Firm*—Cushman, Darby & Cushman

[57] ABSTRACT

A powdered fiber bundle of bamboo shoot which is capable of swelling with water is produced by heating bamboo shoot with heated steam at a pressure of 3 to 8 kg/cm$^2$ (gauge) at a temperature of 130° to 180° C., releasing the pressure at once, drying and pulverizing the squirting bamboo shoot and collecting fine powders. The powdered fiber bundle which has been washed with water sufficiently until it loses any taste and odor is useful as a food additive for supplementing fibrous material to foods deficient in vegetable fiber content.

4 Claims, 4 Drawing Figures

FOOD ADDITIVE FOR REINFORCING FOODS DEFICIENT IN FIBER CONTENT

GROSS REFERENCE TO THE RELATED APPLICATION

This is a continuation-in-part of U.S. Ser. No. 764,464 filed Jan. 31, 1977 and now abandoned.

This invention relates to a food additive composed of vegetable fibrous material which is suitable for use in reinforcing foods deficient in fiber content.

Intestinal diverticulum is one of the adult diseases which attracts a particular attention currently. A posteriori, it occurs predominatingly in the duodenum and the large intestine with symptoms close to those of hypersensitive colotis, such as constipation alternate occurrence of constipation and diarrhea and abdominal pain. If a patient has diverticulitis as the result of bacterial infection from the intestinal content, he complains of abdominal pain, fever, increase of leukocyte, nausea and vomiting. After aggravation, it is complicated by hemorrage, perforation, pericolonic abscess, fistula, obstruction, etc. which can be cured only by surgical treatments.

Recently, the relation of intestinal diverticulum to hyperlipemia and arteriosclerosis is becoming a problem. That is, acquired intestinal diverticulum elevates the concentrations of cholesterol and neutral lipid in the blood to cause arteriosclerosis.

As the result of extensive epidemiological investigation carried out in U.S.A., the cause of acquired intestinal diverticulum has been attributed to the deficiency in vegetable fibrous material in the food. In Europe and U.S.A. where people incline towards animal protein foods, about 5% of middle- and old-aged persons have this disease. In Japan, as well, morbidity rate of this disease is increasing year by year.

Although the cause of intestinal diverticulum has alreadily been elucidated, it is quite difficult in general to alter a fixed habit in the diet.

Thus, it is the object of this invention to provide a food additive composed of vegetable fibrous material for use in the prevention of acquired intestinal diverticulum and, in its turn, hyperlipemia.

If one wishes to remedy the deficiency in vegetable fiber without altering his own habit in diet, it is necessary to take a supplementary food which is mainly composed of fibrous material of vegetable origin and does not affect taste, odor and feeling to the tongue of the food itself. It is also necessary that only a small quantity of the supplementary food is enough to remedy the above-mentioned deficiency. In addition, the supplementary food should be entirely free from side effects.

Based on these considerations, the inventors take notice of bamboo shoot which the Orientals have eaten from ancient times as an agreeable food. Bamboo shoot is a sprout formed on the subterranean stem of Phyllostachys plants and rich in vegetable fiber content. According to the description of "Standard Table for the Food Components, Japan", bamboo shoot contains 16% fiber, on dry basis. It contains no harmful component as a food. Particularly, its indigestible fibrous component is harmless at all even if taken continually.

The difficulty encountered in incorporating bamboo shoot into food as a food additive consists in its form, properties, odor, taste and storability. In other words, the difficulty consists in the procedure by which bamboo shoot is transformed into a fine dry powder. Indeed, a dry powder may be obtainable by conventional processes such as comprising boiling chips of bamboo shoot to remove the soluble matter exhaustively followed by treating the residue with hot air or comprising drying the same residue as above at dryness under an elevated pressure followed by lowering the pressure at once. However, the powder obtained by these processes are inferior to that obtained by the process of this invention. If the first conventional process is adopted, the product retains the taste, odor and toughness of the starting material enough to give an extraneous feeling to the tongue. If the second conventional process is adopted, the material undergoes carbonization. Under microscope, the product of this invention gives a picture of numerous water-swellable fiber bundles, whereas the products of the conventional processes predominantly give a picture of parenchyma, probably composed of collenchyma or sclerenchyma with little content of fibrous tissue.

According to this invention, there is provided a food additive composed of powdered water-swellable fiber bundle of bamboo shoot for use in supplementing fibrous material to foods deficient in vegetable fiber and thereby preventing intestinal diverticulum.

The food additive of this invention is prepared by heating a bamboo shoot with heated steam at a pressure of 3 to 8 kg/cm$^2$ (gauge) at a temperature of 130° to 180° C., releasing the pressure at once, drying and pulverizing the squirting material, and finally collecting fine powders, the bamboo shoot having been freed from bonded water being washed with water sufficiently until it loses any taste and odor.

The process disclosed in Japanese Patent Publication No. 42183/1976 (Nov. 13, 1976) may resemble the process of this invention in some sense. However, it lacks the steps of pulverizing and sieving, and aims at obtaining a dried bamboo shoot constituted of water-swellable fiber bundle which retains the original form and is usable as a storable food from which dishes can be prepared at will.

Therefore, the process of this invention differs from it in that fiber bundle which swells with water is taken out in a powdery form and used as a food additive with the aim of preventing intestinal diverticulum.

Any species of bamboo shoot belonging to Genus Phyllostachys may be used in this invention, among which particularly preferable are those usually eaten for food such as the bamboo shoots of *Phyllostachys kubescens* Mazel, *Phyllostachys bambusoides* Sieb. et Zucc. and *Phyllostachys nigra* Munro var. Henonis Staph. Though the whole body of a bamboo sprout can be used, it is preferable to use about the lowest ⅓ part. Before being used in this invention, a bamboo shoot should be unsheathed to leave the edible part. The edible part may not always be fresh, but a boiled material, a material boiled and then refined with water, a material preserved with salt, and a material seasoned with water-soluble condiments and then sealed for preservation are all usable. The fresh bamboo shoot having so-called bonded water in the sense of food analysis is voluminous and not preferable to those preservable ones which have lost the bonded water. Therefore, it is preferable to eliminate bonded water from the fresh bamboo shoot by means of attrition, boiling, salt pickling or the like. Boiling is the simplest procedure and desirable because some of the components are converted into a digestible form. Preferably, this procedure is carried out by using chipped bamboo shoot.

The bamboo shoot, from which water has been drained out under an elevated pressure or not drained out, is placed in an autoclave. Superheated steam having a pressure of 3 to 8 kg/cm$^2$ (gauge), preferably 4 to 6 kg/cm$^2$ (gauge), is introduced and the temperature is kept at 130° to 180° C., preferably 140° to 160° C., after which the pressure is released at once. During the heating, the steam in the autoclave is in a superheated dry state, though it may also be in the state of saturated steam. Therefore, it is preferable to heat the autoclave by means of an external jacket to which heat is supplied by a heating medium or superheated steam.

The mass of bamboo shoot squirts together with steam, whereupon it is smashed. The state of bamboo shoot after being smashed ranges from a powder to a mass close to the original form, depending upon the pressure applied. In most cases it assumes a mixed state thereof, having an appearance of swollen cotton flock. The water-soluble contaminates are removed by squeezing off the associated water and, if necessary, washing the residue with water, after which it is dried at 70° to 80° C. by introducing air or, more preferably, nitrogen or carbon dioxide gas. The dried product is pulverized with a grinder and sieved, and the fraction passing 42 mesh Tyler sieve is collected.

Washing for removing water-soluble component of the bamboo shoot is carried out at any stage of the procedure after the bonded water is lost, for example, in the materials as it is preservable one, that is, boiled, pickled or seasoned material; in the smashed material or in the powder form. They are thoroughly washed with water to remove soluble components, whereby they lose their taste and odor almost exhaustively. Preferably, the washing is carried out in the stage of a material which has lost the bonded water.

The powder thus obtained assumes light yellow, has no taste and no odor, causes no extraneous feeling on the tongue and readily absorbs water to swell. Under microscope, the swollen powder is predominantly composed of separate fiber bundles. This makes a contrast to the fact that if, for comparison, a chip of bamboo shoot is formed into powder by boiling and washing with water followed by drying with hot air the resulting product is insufficient in swelling property in water and gives a mere picture of mass under microscope.

In the accompanying drawings.

Figure 1:
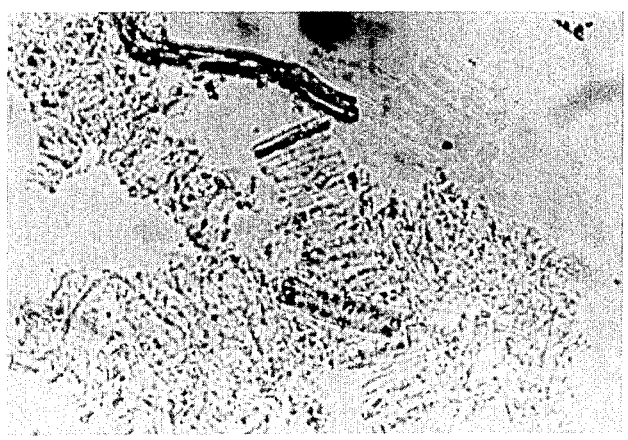
FIG. 1 illustrates a magnified photograph ($\times 200$) of the swollen fiber obtained in following Example 2 of this specification.
Figure 2:
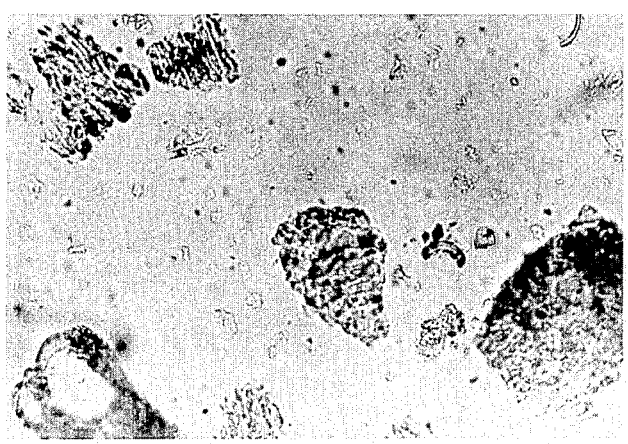
FIG. 2 illustrates a magnified photograph ($\times 200$) of the powdered bamboo shoot obtained by a mere drying with hot air, taken after the powder has absorbed water.
Figure 4:
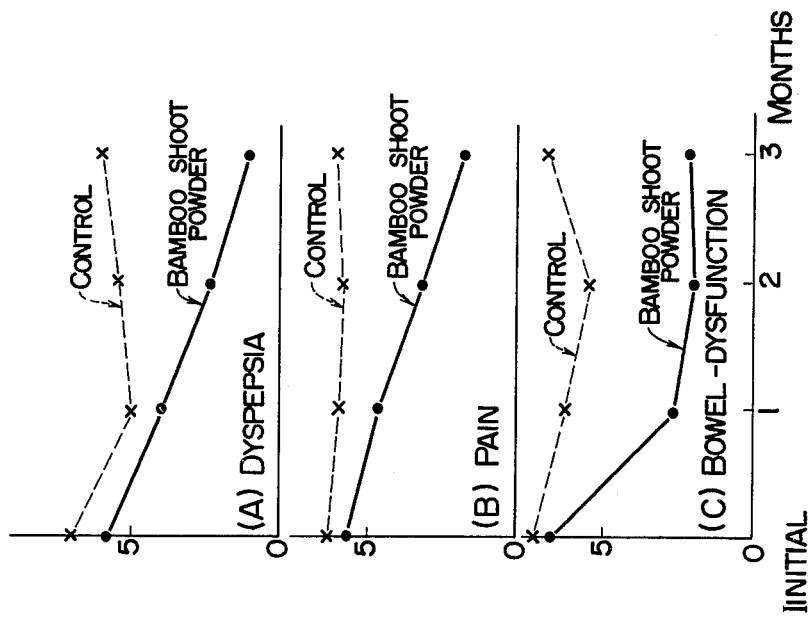
Figure 3:
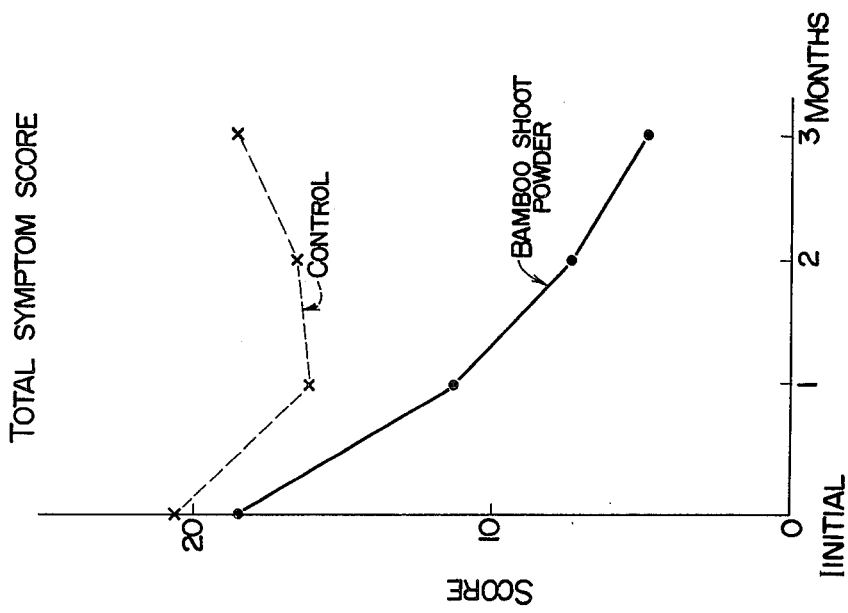

FIG. 3 illustrates the changes in mean symptom score over three months for the bamboo shoot powder and control groups for total symptoms, and FIG. 4 illustrates the changes in means symptom score over three months for the bamboo shoot powder and control groups for dyspepsia (A), pain (B) and bowel-dysfunction (C), respectively, in the human clinical tests by administering the bamboo shoot powder of this invention.

The food additive of this invention may be incorporated in any manner into foods deficient in vegetable fiber. For example, it may be cooked together with the main food, or added to a cooked food. It is presumable that the object of preventing intestinal diverticulum can be achieved by dosing 1-2 g per each meal. It is also permitted to administer it orally together with usual diet in the form of powder, capsule or tablet, either alone or in the form of a mixture with other conventional adjuvants.

The following examples will further illustrate this invention, provided that the essence of this invention is not limited by these examples but is defined only by the accompanying claims.

EXAMPLE 1

Bamboo shoots of *Phyllostachys bambusoides* Sieb. et Zucc. were unsheathed and their roots, about ⅓ of the total length were cut off. 40 kg of the roots was transversely cut into slices having a thickness not greater than 2 mm by means of a slicer. The slices were placed in a vessel, water was added in an amount enough to submerge the slices, and the whole was boiled with heating. The water was three times renewed and boiled, after which the percolation had no taste nor odor. By this procedure, the major part of soluble components was eluted into hot water. After the water was drained out of the slices, they were introduced into an autoclave and the water jacket directly connected to the autoclave was heated until an inner pressure of 3 kg/cm$^2$ (gauge) at 135° C. was reached. The pressure was maintained at this value for 30 minutes, after which the autoclave was opened at once. The squirting slices of bamboo shoot were collected in a receivor. Due to the rapid pressure change, the tissues of slices expanded, so that the slices obtained assumed an appearance of cotton flock. They were dried in a vacuum drier over a time period of about 10 hours. The dried product was pulverized by means of a mill, sieved with a 42 mesh sieve, and there was obtained 985 g of a slightly yellow-colored powdery product. It has no odor at all. When put into mouth, it exercised no representable taste and gave no extraneous feeling to the tongue.

EXAMPLE 2

10 kg of slices prepared by repeating the procedure of Example 1 was boiled and percolated in the same manner as above, after which it was pressed and squeezed by a hydraulic press. Thereafter, it was introduced into the same autoclave as used in Example 1, pressure was raised to 5 kg/cm$^2$ at 150° C. and maintained there for 10 minutes, and then the autoclave was opened at once so as to expand the tissues. The product was dried, pulverized and sieved with a 42 mesh sieve to give 260 g of powdery product. In organoleptic test, the powder thus obtained was scarcely different from the powder of Example 1, except that it was somewhat superior to the latter in the feeling to the tongue.

EXAMPLE 3

Example 1 was repeated except for using 50 kg of the slice and 8 kg/cm$^2$ of the pressure at 180° C. 1250 grams of powder which gave almost same result in organoleptic test.

In the following examples, concrete usages of the powder obtained above will be illustrated.

EXAMPLE 4

Into 250 ml of a soup prepared from the commercially available soup essence was incorporated 1.5 g of the powdered bamboo shoot produced according to the process of this invention. When used for food, the resulting mixture was relishable as a light potage in which the taste of soup itself was not damaged at all.

EXAMPLE 5

Into a mixture of 400 g of blended mincemeat, ½ piece of minced onion, one slice of bread, a small quantity of milk and one piece of egg was incorporated 10 g of the powdered bamboo shoot produced according to the process of this invention. The resulting mixture was seasoned with edible salt and nutmeg, from which a hamburg steak was prepared. It was sampled by five samplers. Thus, all the five samplers evaluated it as relishable.

EXAMPLE 6 (Tablet for Oral Administration)

300 g of the powdered bamboo shoot obtained in Example 1 which contained 50% crude sugar, 20% crude protein, 2% crude lipid, 25% fibrous material, 1.2% ash and 1.8% water was blended with 50 g of calcium phosphate, 600 g of starch and 50 g of gum arab. The resulting mixture was kneaded together with water, formed into spherical granules and dried in vacuum to give granules having a diameter of about 5 mm. They were compressed by means of a press to give tablets having an individual weight of 500 mg.

EXAMPLE 7 (Capsule for Oral Administration)

25 g of the same powdery bamboo shoot as in Example 5 was blended with 15 g of corn starch, 9.8 g of cellulose and 0.2 g of magnesium stearate. Then, 300 mg of the resulting mixture was packed into No. 1 capsule to give an encapsulated preparation.

Referential Example 1 (Acute Toxicity Test)

The powdery bamboo shoot obtained in Example 1 was examined on acute toxicity by using 5 male Wister rats each having a body weight of about 200 g.

The powder was mixed with normal feed and orally administered at a dose of 0.2 g/kg, 0.5 g/kg, 1 g/kg, 2 g/kg or 5 g/kg. During seven days over which the animals were watched, there was detected no case of death.

Thus, it was concluded that the fibrous powder produced from bamboo shoot according to this invention has a very high safety.

Referential Example 2 (Animal Experiment on the Efficacy)

The reinforcing effect of the powder of this invention, produced from bamboo shoot and containing fibrous material as active ingredient, upon foods deficient in fiber content was experimentally investigated.

The experiment comprises examining how the powder of this invention prevented rabbits from arteriosclerosis of the aorta. Thus, to the first group (5 heads) of male rabbits, having a body weight of about 3 kg, was given a synthetic feed which was deficient in fiber content and had preliminarily been incorporated with 3% cholesterol. To the second group (5 heads) of male rabbits was given another feed prepared by incorporating 3% (by weight) of the powdered bamboo shoot obtained in Example 1 into the same feed as given to the first group. After breeding the animals for 3 months, they were autopsied. In the first group, atheloma was observed in the aorta of all cases, demonstrating the occurrence of arteriosclerosis. On the contrary, in the second group to which powdered bamboo shoot was given together with normal feed, there was observed no occurrence of arteriosclerosis in any of the cases. Moreover, cholesterol and neutral lipid in the blood were lower in the second group than in the first group.

Referential Example 3 (Clinical test for human)

The therapeutic effect of the bamboo shoot powder of this invention to the diverticular diseases of human was clinically tested by the following manner:

Test Methods (1) Patients

Patients had large-bowel symptoms and the radiological changes of diverticular diseases, but no evidence of complications or other colonic disorders. They were receiving no treatment at the time.

(2) Test Sample

A wheat bread as test sample containing 15% by weight of a bamboo shoot powder, which had been obtained by the same manner as in Example 1, was prepared by the usual manner. The bamboo shoot powder used had a fiber content of 28% by weight.

(3) Administration

Three slices of the test wheat bread (150 g) were supplied daily to each patient of one group (five patients) for three months. On the other hand, the same amount of wheat bread prepared from the same wheat as above containing no bamboo shoot powder were supplied daily as control to each patient of another group (five patients) for three months. The patients were interviewed at monthly intervals to complete a symptomatic questionnaire on "dyspeptic" symptoms (nausea, vomiting, heart-burn, eructation, and abdominal distention), pain, and symptoms of "bowel dysfunction" (passage of excessive wind per rectum, the need to strain, the presence of anal pain on defecation, the frequency of evacuation, the consistency of the motion, the presence of blood or mucus, the feeling of incomplete emptying of the rectum after defecation, and the use of laxatives). Symptoms were scored 0–6 for frequency and severity on a standard descriptive scale, and the score for pain was doubled to give it the same weight to that of the other two symptoms. After the three months' treatment, their symptoms scores had been calculated.

RESULTS

The symptoms scores thus obtained are shown in FIGS. 3 and 4. FIG. 3 shows the changes in mean symptom score over three months for the bamboo shoot powder and control groups, for total symptoms, and FIG. 4 shows the changes in means symptom score over three months for the bamboo shoot powder and control groups, for dyspepsia (A), pain (B) and bowel-dysfunction (C), respectively.

As is clear from the above results, the therapeutic effect to decrease the symptoms by administering the bamboo shoot powder of this invention is significant as compared with the case where no bamboo shoot powder is used.

What is claimed is:

1. A method of reducing the symptoms of intestinal diverticulum in a person comprising orally administering to a person in need thereof a food additive consisting essentially of a powdered water-swellable fiber bundle of bamboo shoots belonging to the genus Phyllostachys for supplementing fibrous material in food deficient in vegetable fiber content, said food additive having been prepared by a process comprising heating bamboo shoots with steam at a pressure of 3 to 8 kg/cm² gauge at a temperature of 130° to 180° C., releasing the pressure at once, drying and pulverizing the material thus obtained and collecting the fine powder obtained, said bamboo shoots subsequent to the release of pressure and being free from bonded water having been washed with water sufficiently to lose its taste and odor in an amount effective to reduce such symptoms.

2. A method according to claim 1 comprising administering the food additive together with a starch containing food.

3. A method according to claim 1 comprising administering the food additive together with a protein containing food.

4. A method according to claim 1 wherein the food additive is employed at a meal and is used in an amount of 1–2 grams during the meal.

* * * * *